US006379570B1

(12) United States Patent
Fatula, Jr. et al.

(10) Patent No.: US 6,379,570 B1
(45) Date of Patent: Apr. 30, 2002

(54) METHOD OF MAKING HIGH DEFINITION CHEVRON TYPE MR SENSOR

(75) Inventors: Joseph John Fatula, Jr.; Richard Hsiao; Carol Yoshiko Inouye, all of San Jose; Li-Chung Lee, Saratoga, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/450,092

(22) Filed: Nov. 29, 1999

Related U.S. Application Data

(62) Division of application No. 08/926,264, filed on Sep. 5, 1997, now Pat. No. 6,118,623.

(51) Int. Cl.[7] ............................. B44C 1/22; G11B 5/33
(52) U.S. Cl. ........................... 216/22; 216/41; 216/49; 29/603.01; 29/603.18; 204/192.1
(58) Field of Search ............................. 216/22, 41, 49; 29/603.01, 603.18; 360/113; 204/192.1

(56) References Cited

U.S. PATENT DOCUMENTS

| | | | | |
|---|---|---|---|---|
| 5,515,221 A | * | 5/1996 | Gill et al. | 360/113 |
| 5,530,608 A | * | 6/1996 | Aboaf et al. | 360/113 |
| 5,568,335 A | * | 10/1996 | Fontana et al. | 360/113 |

FOREIGN PATENT DOCUMENTS

| JP | 60-15922 | 3/1985 |
|---|---|---|
| JP | 5-182135 | 7/1993 |

OTHER PUBLICATIONS

R. W. Arnold et al., "Wear–Resistant Substrates for MR Heads with Good Thermal Conductivity", *IBM Technical Disclosure Bulletin*, vol. 22, No. 5, Oct. 1979, pp. 2149–2150.

* cited by examiner

*Primary Examiner*—Randy Gulakowski
*Assistant Examiner*—Shamim Ahmed
(74) *Attorney, Agent, or Firm*—Ervin F. Johnston

(57) ABSTRACT

A method is provided for making a well-defined, highly-predictable chevron type MR sensor for a read head. A first material is selected for a first gap layer. A selected second material is deposited on the first gap layer followed by a resist frame that has elongated openings exposing elongated top portions of the first gap layer that extend at an acute angle to a head surface of the read head. A selected reactive ion etch (RIE) is employed to etch away the exposed portions of the second material layer down to the first material of the first gap layer. The material of the second material layer is chosen to be etched by the RIE while the material of the first gap layer is chosen not to be etched by the RIE. An example is $Al_2O_3$ for the first gap layer, $SiO_2$ for the second material layer and a RIE that is fluorine based. The resist frame is removed leaving elongated strips of the second material layer extending at the aforementioned angle to the head surface. MR material is then sputtered on top of the first gap layer and on the second material strips building up a MR sensor which has a ribbed structure on each of its first and second surfaces. The resultant MR head has second material strips sandwiched between the first gap layer and the MR sensor.

16 Claims, 8 Drawing Sheets

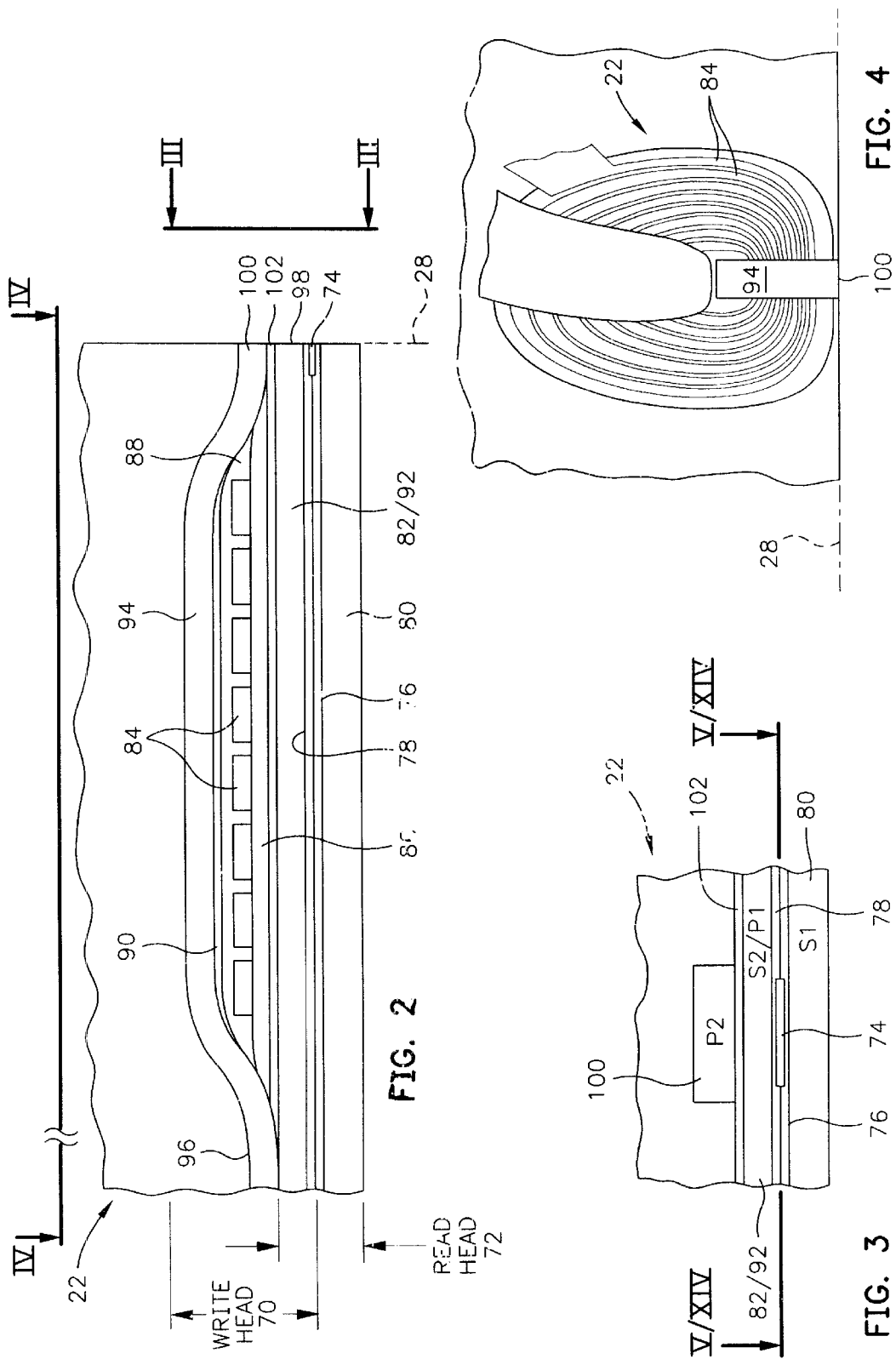

METHOD OF MAKING HIGH DEFINITION CHEVRON TYPE MR SENSOR

CROSS REFERENCE TO RELATED APPLICATION

This is a divisional application of application Ser. No. 08/926,264 filed Sep. 5, 1997, now U.S. Pat. No. 6,118,623.

This application is related to commonly assigned U.S. Pat. No. 5,530,608 which is incorporated by reference herein.

BACKGROUND OF THE INVENTION

1. Field of the Invention

The present invention relates to a method of making a high definition chevron type magnetoresistive ("MR") sensor, and more particularly to a method of sputtering a chevron shaped MR sensor with high depth control, with planar walls that meet at 90°, and with no fencing upon removal of a patterning mask.

2. Description of the Related Art

An MR read head is employed for sensing magnetic fields on a magnetic storage medium, such as a longitudinally moving magnetic tape of a tape drive. In such a tape drive, the MR head is mounted on a support, while guide rollers bias the tape into contact with a head surface of the read head. When the tape moves longitudinally, the read head senses magnetic fields in longitudinally extending tracks on the magnetic tape. An actuator is connected to the support for moving the read head transversely across the tape, to selected information tracks. A write head is typically combined with a magnetoresistive (MR) read head to form a combined or merged MR head. With this arrangement the merged MR head is also capable of writing information signals on selected longitudinally extending tracks as positioned by the actuator. Typically the write head writes tracks at a certain width, while the read head reads a narrower track width. In the art this is referred to as "write-wide, read-narrow".

An MR head has an MR sensor sandwiched between first and second gap layers that, in turn, are sandwiched between first and second shield layers. The MR sensor includes multiple thin film layers. The most important layer is an MR stripe; the other layers are for biasing and capping. The spacing between the first and second shield layers determines the linear read resolution of the MR head with respect to an information track. The MR stripe, which may be NiFe, is typically elongated, with its length aligned parallel to the head surface and perpendicular to the movement of the tape. By shape anisotropy this elongation establishes an easy magnetic axis along the length of the MR stripe. Thus, without some biasing scheme, the magnetic moment of the MR stripe will be directed along its lengthwise direction.

First and second leads may be connected to opposite lengthwise ends of the MR sensor for conducting a sense current through the MR stripe. The spacing between the leads establishes the active region of the MR sensor, which defines the sensor's track width. Sense current is provided by channel electronics, which may also be referred to as processing circuitry. When sense current is conducted through the MR stripe, resistance changes in the MR stripe cause proportional changes in potential across the stripe. These potential changes are then processed to produce playback signals corresponding to data signals stored on the magnetic tape. It is important that the MR sensor be constructed with predetermined conductivity to satisfy the design of the channel electronics. Conductivity limits are exceeded when the MR sensor is constructed with too much or too little conductive material.

A typical type of MR sensor is an anisotropic MR (AMR) sensor. The transfer function of the AMR sensor varies by $\cos^2 \alpha$, where $\alpha$ denotes the angle between a magnetization direction and a current-density vector. The transfer function is a plot of the resistance change of the MR sensor as a function of the strength of an applied field signal from the tape, and can be shown as a curve (transfer curve) on a graph. When the direction of the magnetic moment of the MR stripe and the direction of the sense current in the MR sensor are parallel, the MR stripe has maximum resistance; when these directions are perpendicular, the MR stripe has minimum resistance. It is desirable that an AMR sensor operate within a linear portion of a bell-shaped transfer curve. This is accomplished by appropriately positioning the direction of the magnetic moment of the MR stripe 45° to a plane of the head surface. Assuming that positive and negative field signals from the moving magnetic tape are equal, then each of the clockwise and counterclockwise rotations of the magnetic moment, the positive and negative changes in magnetoresistance of the MR stripe, and the positive and negative signal responses will be equal.

One way to bias the magnetic moment of the MR stripe at 45° is to provide the MR sensor with a soft adjacent layer (SAL) adjacent to the MR stripe, but separated therefrom by an insulation layer. When the sense current is conducted through the MR stripe, a transverse field is applied to the SAL and the SAL, in turn, applies a transverse field to the MR stripe which rotates the magnetic moment of the MR stripe to the 45° angle.

Another way to obtain the desired bias angle is to employ shape anisotropy to establish the direction of the magnetic moment of the MR stripe along the desired bias angle. This scheme is employed by a chevron type MR sensor which consists essentially of only the MR stripe. The chevron type MR sensor has a plurality of elongated ridges that are uniformly spaced from one another. Between the ridges are elongated trenches. These ridges and trenches are slanted to the plane of the head surface by some angle, such as 45°. This arrangement has the appearance of multiple chevrons, as seen in cross-section, such as a head surface view. The result is that the easy axis of the MR stripe is established along the angle of the chevron structure or close thereto instead of being parallel to the head surface. A SAL is not employed in this scheme. When sense current is conducted through the MR stripe, the current is directed parallel to the head surface and the magnetic moment is directed at substantially 45° to the head surface. This provides the aforementioned desirable bias angle for the operation of the MR sensor.

Typically, an MR sensor has first and second surfaces that are perpendicular to the head surface. Each of the first and second surfaces is configured with the ridges to provide a ribbed structure. The ridges on the first surface are positioned opposite the trenches on the second surface and the ridges on the second surface are positioned opposite the trenches on the first surface. Between the ridge structures, an intermediate portion of the MR sensor connects the ridges together.

Each ridge is bounded by first and second side walls, a flat surface at the top of the ridge and the intermediate portion. Each trench between a respective pair of ridges is bounded by the side walls of the ridges and a flat surface at the bottom of the trench. In order to promote an orderly shape anisotropy of the MR sensor it is necessary that the side walls be planar and perpendicular to the flat surfaces of the ridges and the side walls. As stated hereinabove, the MR sensor is sandwiched between the first and second gap layers. These layers are typically constructed of alumina ($AL_2O_3$). Accordingly, the ridges and trenches of the first surface of the MR sensor interfacially engage trenches and ridges respectively in the first gap layer and the ridges and trenches of the second surface of the MR sensor interfacially engage trenches and ridges of the second gap layer.

The present method of making the chevron type MR sensor typically results in poorly formed chevron structures. First a photoresist mask is spun on the first gap layer and patterned by light followed by dissolving the exposed portions to provide elongated spaced apart openings that are slanted at the appropriate angle to the head surface. Next, ion beam milling is employed to mill elongated trenches in the first gap layer that are spaced apart by non-milled elongated top surfaces therebetween. These trenches and surfaces are slanted to the head surface. The photoresist layer is then removed and MR material is sputtered into the trenches and on top of the top surfaces. This provides each of the first and second surfaces of the MR sensor with the chevron structure. The second gap layer is then deposited on the chevron structure of the second surface of the MR sensor.

Unfortunately, the step of ion milling the first gap layer results in the first gap layer having poorly formed side walls, unreliable depths and fencing. The side walls have various slopes with respect to the top surfaces of the first gap layer, the depths are too deep upon overmilling, or too shallow upon undermilling, and fencing is caused by redeposition of the milled material (redep) on the side walls. Since the redep typically sticks up above the side wall it appears as a fence. Next, during the step of depositing the MR material, the MR material replicates the shape of the first gap layer and has sloping side walls, bottoms that are too deep or too shallow and fencing. The manufacturing yield has been extremely low with the present method because of process variations in the amount of conductive material in the chevron shaped MR sensor. As stated hereinabove, the amount of conductive material must be precise to satisfy the requirements of the channel electronics. Accordingly, there is a strong felt need to provide an improved method of making chevron structures for AMR read heads.

SUMMARY OF THE INVENTION

The present invention provides a method of making a well-defined chevron MR sensor with virtually no process variation. The first step is to select a first material for the first gap layer that is not etched by a selected reactive ion etch (RIE) and to select a second material that is etchable by the RIE. Both the first and second materials must be non-magnetic and non-conductive. A layer of the second material is then formed on the first gap layer. The thickness of the second material layer is chosen to be equal to a desired depth of the chevron structure. A photoresist layer is then spun on the second material layer and photopatterned to provide elongated openings that are slanted at an acute angle to the head surface and that expose elongated top surface portions of the second material layer. The RIE is then employed to etch the exposed top surface portions of the second material layer. The RIE will etch through the thickness of the second material layer until it reaches the top of the first gap layer. Since the first gap layer cannot be etched by the RIE material, removal is terminated. Exact depth control (the thickness of the second material layer) is obtained even though the duration of the RIE exceeds that required to mill the thickness of second material layer. The importance of this result will become evident after describing the next steps of the process.

Next, the photoresist mask is removed, leaving elongated rectangular strips of second material that are separated by elongated flat surfaces of the first gap layer. The strips are slanted at the acute angle to the head surface and have first and second planar side walls that are interconnected by a top planar surface. The first and second side walls are perpendicular to the top surface of each strip. This is important for producing a well-defined chevron structure, which will become evident from the next step of the process.

Next, MR material is sputtered on the top surfaces of the strips and on the elongated flat surfaces of the first gap layer between the strips. This forms an MR structure that has spaced apart ridges of MR material on first and second surfaces of the MR structure, with trenches therebetween. The ridges on the first surface are opposite trenches on the second surface, and the ridges on the second surface are opposite trenches on the first surface. Since the first surface ridges are formed by the first material strips and the elongated flat surfaces of the first gap layer therebetween, they have first and second side walls that are perpendicular to a bottom planar surface. The second surface ridges that are sputtered on the top planar surface of the second material layer likewise have first and second side walls that perpendicular to a top planar surface. Each of the trenches between the ridges have first and second planar side walls that are perpendicular to a bottom planar surface of each trench. As a result, the MR sensor appears in cross-section as a sawtooth curve with squared-off ridges that are located opposite squared-off trenches. Continuation of making the MR head comprises forming a second gap layer on the second surface of the MR sensor. The second gap layer will cover the second surface of the MR sensor filling in the trenches of the chevron structure thereon. The present process has eliminated the step of milling the first gap layer, which causes the aforementioned problems of depth control, sloping side walls and redep.

An example of materials for the first gap layer and the second material layer are $Al_2O_3$ and $SiO_2$ and an example of the RIE is a RIE that is fluorine based. The product produced by the method is novel due to fact that a plurality of intermediate second material strips are sandwiched between the first gap layer and the MR sensor.

An object of the present invention is to provide a method of making a chevron type MR sensor which is square cornered.

Another object is to provide a method of making a chevron type MR sensor with substantially no process variation.

A further object is to provide a method of making an MR sensor with a chevron structure on each of first and second surfaces that is well defined and has predictable configurations.

Still another object is to provide a method of making a chevron type MR sensor on a first gap layer wherein the first gap layer is not altered by milling.

Still a further object is to provide a method of making a chevron MR sensor with exact depth control.

Still another object is to provide a method of making a chevron type MR sensor that predictably satisfies the design parameters of channel electronics.

Still a further object is to provide a novel MR sensor that has elongated strips of nonmagnetic material sandwiched between a planar first gap layer and a chevron type MR sensor.

Other objects and advantages of the invention will become apparent upon reading the following description taken together with the accompanying drawings.

BRIEF DESCRIPTION OF THE DRAWINGS

FIG. 2 is a view taken along plane II—II of FIG. 1 showing a longitudinal cross-sectional view of a combined read and write head;

FIG. 3 is a view taken along plane III—III showing a head surface of the combined read and write head;

FIG. 4 is a view taken along plane IV—IV showing the top of the write head portion with an overcoat layer removed to show a write coil with first and second leads and a second pole piece of the write head;

DESCRIPTION OF THE PREFERRED EMBODIMENTS

Figure 1:
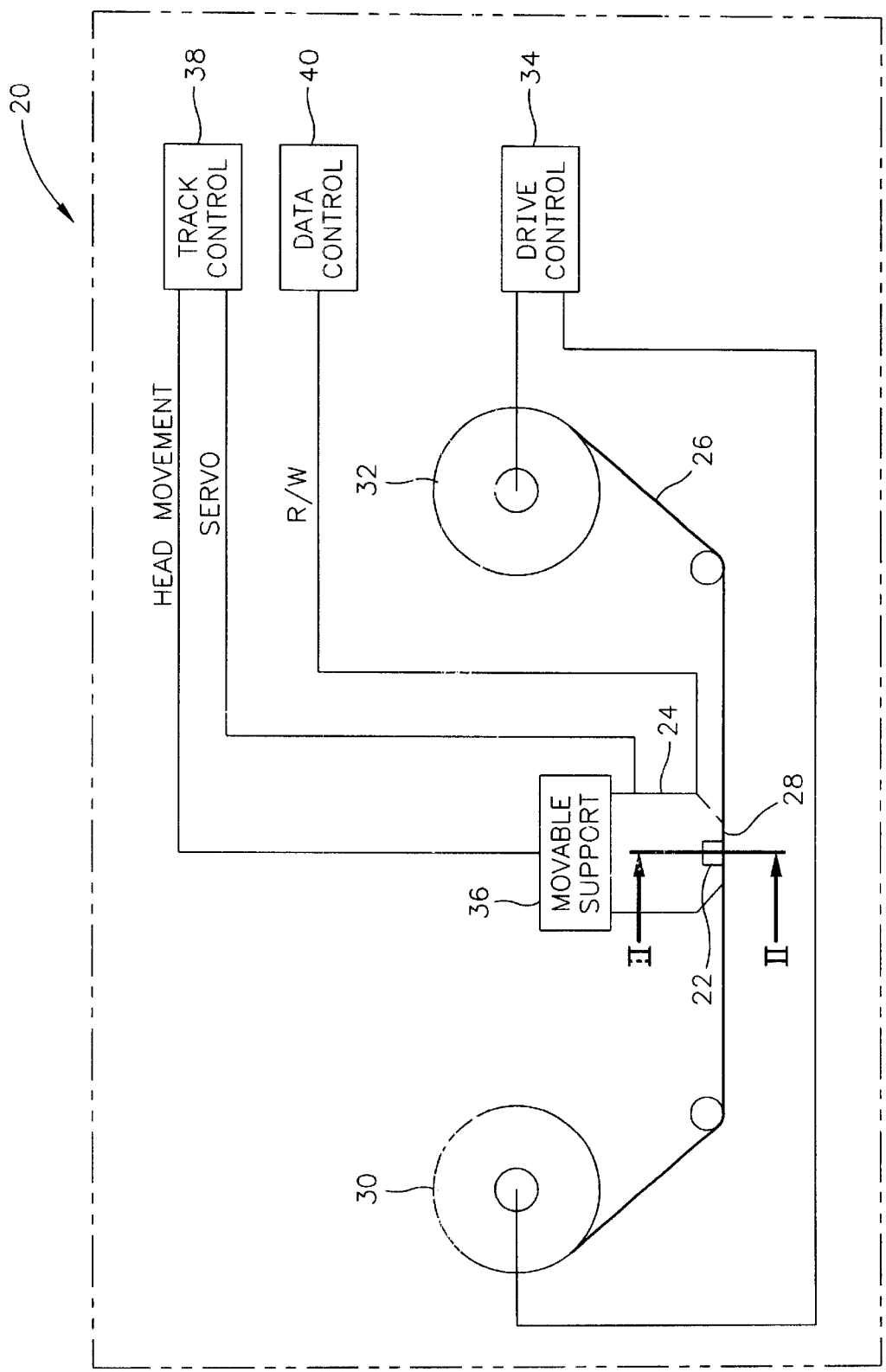
FIG. 1 is a schematic illustration of an exemplary magnetic tape drive employing the magnetic head assembly of the present invention.

Referring now to the drawings wherein like reference numerals designate like or similar parts throughout the several views, there is illustrated in FIG. 1 a magnetic tape drive 20 which includes a combined read/write head 22 that is mounted on a support 24. The magnetic tape 26 is moved linearly past a planar surfaces 28 of the support 24 and head 22 in either a forward or reverse direction by a pair of reels 30 and 32. A drive control 34 is provided for rotating the reels 30 and 32 alternately in the forward and reverse directions. The reels 30 and 32 may be open or one or more of the reels may be mounted in a cartridge. When a cartridge is employed the magnetic tape is usually pulled from the cartridge by a leader pin which interlocks with a leader block within the cartridge.

The support 24 is mounted on a movable support 36 so that the combined magnetic head 22 can be supported in a transducing relationship with respect to the magnetic tape 26. The movable support 36 moves transverse to the magnetic tape 26 so that read and write heads of the combined head 22 can read and write magnetic information signals on the longitudinally moving tape 26. The read head of the combined magnetic head 22 may be employed for reading servo tracks on the tape so as to keep the read and write heads within a desired track. With this arrangement, the combined magnetic head 22 feeds servo information to a track control 38 which processes this information and feeds head movement signals to the movable support 36. Further, the magnetic heads of the combined head 22 are connected to a data control 40 which processes signals from the read head and to write head.

FIG. 2 is a side cross-sectional elevation view of the combined magnetic head 22 which has a write head portion 70 and a read head portion 72, the read head portion employing a chevron type magnetoresistive (MR) sensor 74 of the present invention. FIG. 3 is a head surface view of FIG. 2. The MR sensor 74 is sandwiched between first and second gap layers 76 and 78 and the gap layers are sandwiched between first and second shield layers 80 and 82. In response to external magnetic fields, the resistance of the MR sensor 74 changes. A sense current $I_s$ conducted through the sensor causes these resistance changes to be manifested as potential changes. These potential changes are then processed by the data control 40 shown in FIG. 1.

The write head portion 70 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the head surface 28.

Figure 5:
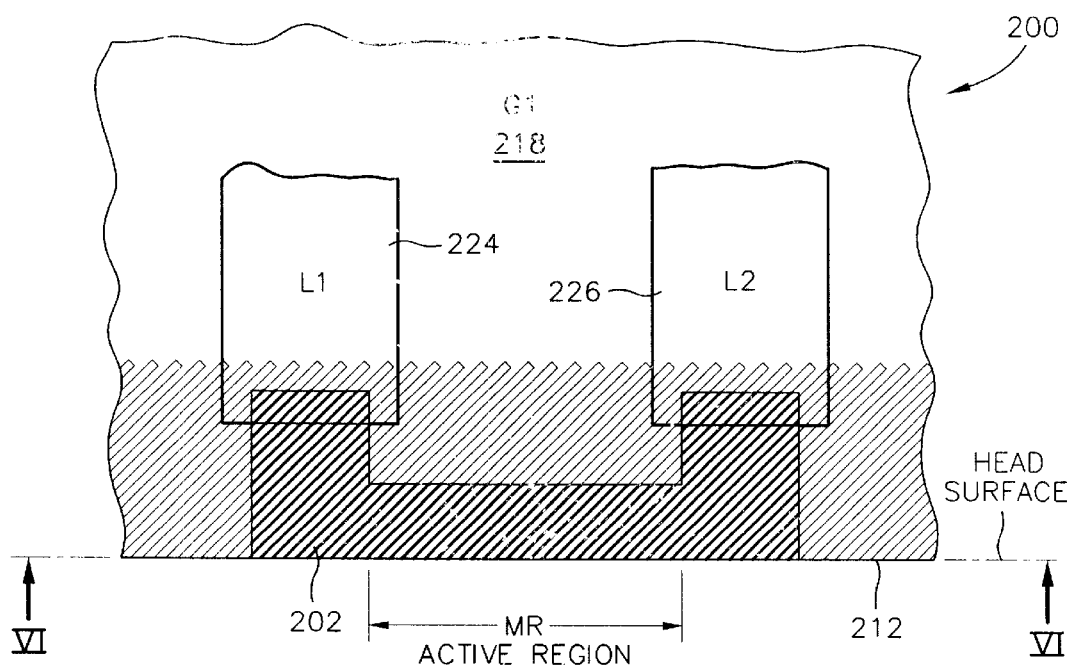
FIG. 5 is a view taken along plane V—V of FIG. 3 showing a prior art chevron type MR sensor of the read head.
Figure 6:
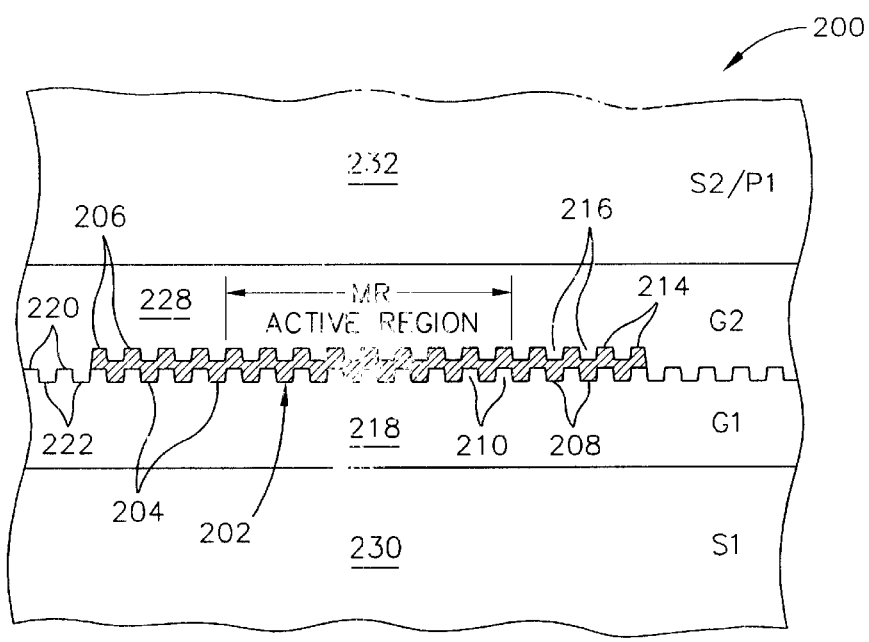
FIG. 6 is a view taken along plane VI—VI of FIG. 5 showing a head surface view of the read head with a prior art chevron type MR sensor.

FIGS. 5 and 6 illustrate a read head 200 which includes a prior art chevron type MR sensor 202. As shown in FIG. 6 the NR sensor 202 has first and second surfaces 204 and 206 wherein each of these surfaces has a ribbed shape structure. As shown in FIGS. 5 and 6, the first surface 204 of the MR sensor has a plurality of ridges 208 and a plurality of trenches 210 which are arranged in an alternate fashion at an acute angle, such as 45°, to a head surface 212. The second surface 206 of the MR sensor has complementary ridges 214 and trenches 216 which are arranged similarly in an alternate fashion with the ridges 208 of the first surface being opposite the trenches 216 of the second surface. A first gap layer 218 has alternating ridges 220 and trenches 222 which has been filled in the MR region with MR material. As shown in FIG. 5, first and second leads 224 and 226 are connected to the ends of the MR sensor for conducting a sense current $I_S$ therethrough. The MR material between the leads 224 and 226 is the active region of the MR sensor and defines the track width of the MR read head. A second gap layer 228 is placed on top of the first gap layer 218 and the chevron MR sensor 202. The first and second gap layers 218 and 228 are sandwiched between first and second shield layers 230 and 232. The prior art chevron MR sensor 202 is constructed by a prior art method which results in poorly formed side walls, fencing and imprecise depth control of the trenches 210 and 216.

Figure 7:
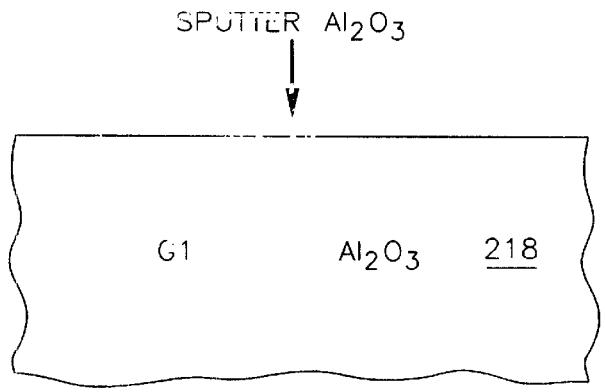
FIG. 7 shows a first step in a prior art method of making a chevron type MR sensor wherein a first gap layer is deposited.
Figure 8:
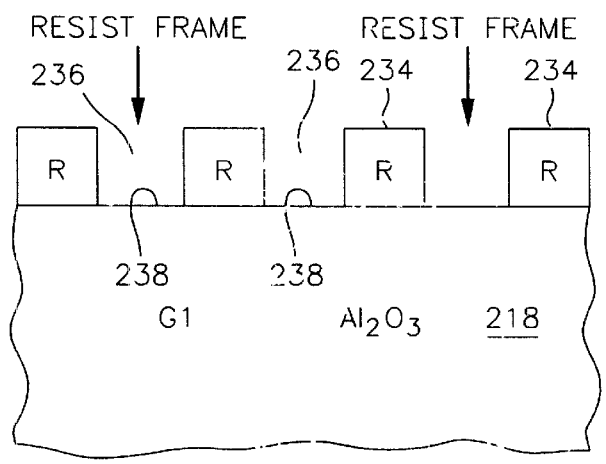
FIG. 8 shows a second step in the prior art method of forming a resist frame on the first gap layer.
Figure 9:
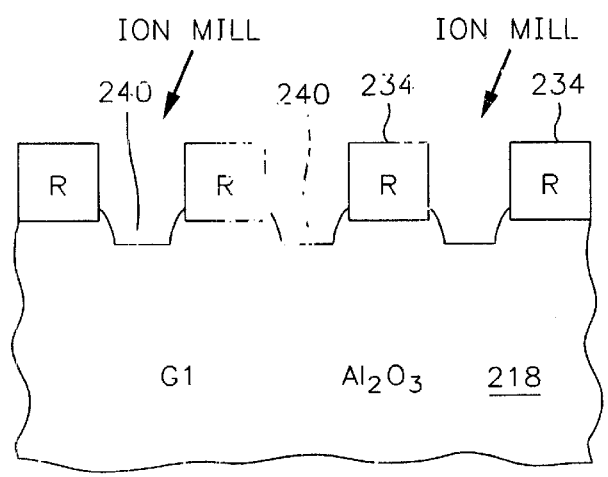
FIG. 9 is a third step in the prior art method employing ion milling to mill away portions of the first gap layer unprotected by the photoresist frame.
Figure 10:
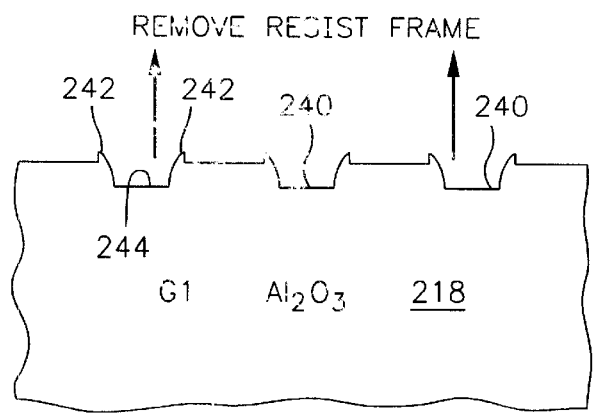
FIG. 10 is a fourth step in the prior art method of removing the resist frame.

The prior art method for making the chevron MR sensor 202 of FIGS. 5 and 6 is shown in FIGS. 7–12. In FIG. 7 the first gap layer 218, which is typically $AL_2O_3$, is formed on the first shield layer 230 (see FIG. 6) by any suitable means such as sputtering. Next, a photoresist frame is formed on the surface of the first gap layer with a plurality of photoresist strips 234 that are separated by open spaces 236. The photoresist strips 234 and the open spaces 236 are elongated and are slanted at the aforementioned angle to the head surface. The open spaces 236 expose surface portions 238 of the first gap layer. Next. ion milling is employed, as shown in FIG. 9, to mill the exposed surfaces 238 of the first gap layer to form elongated spaced apart trenches 240 in the first gap layer that are slanted at an angle to the head surface. Next, the photoresist frame is removed leaving the first gap layer with its trenches 240, as shown in FIG. 10. Unfortunately, the ion milling causes a considerable amount of redeposition (redep) of the $AL_2O_3$ material onto the side walls causing the trenches to have inwardly sloping surfaces. Further, the redep causes fencing 242 which appears as spikes in cross-section, as shown in FIG. 10. Further, there has been no precise depth control of the bottoms 244 of the trenches due to process variations in the ion milling step.

Figure 11:
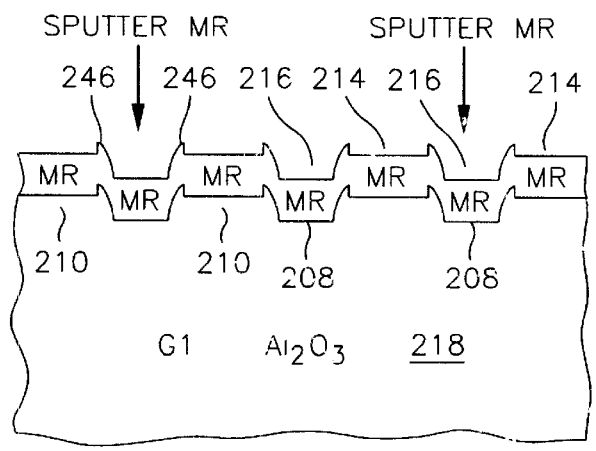
FIG. 11 is a fifth step in the prior art method of forming a chevron configured MR sensor on the first gap layer.
Figure 12:
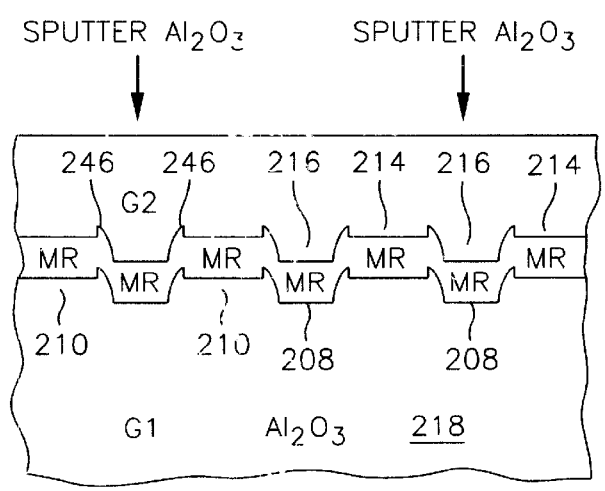
FIG. 12 is the same as FIG. 11 except a second gap layer has been deposited thereon.

Next, MR material is deposited on the first gap layer by any suitable means such as sputtering, as shown in FIG. 11. The result is that the MR material replicates the configuration of the first gap layer causing the ridges 208 and 214 and trenches 210 and 216 of the MR material to have sloped side walls. Further, the ridges 214 have fencing at 246 and there is imprecise depth control of the MR structure within the trenches. This causes an imprecise amount of MR material for conductivity which significantly reduces a manufacturing yield because of a failure to satisfactorily meet the design requirements of the channel electronics, which is encompassed in the data control 40 shown in FIG. 1. Accordingly, there is a strong-felt need to improve the process of making the chevron MR structure so as to improve this yield and the performance of chevron type magnetic read heads.

Figure 13:
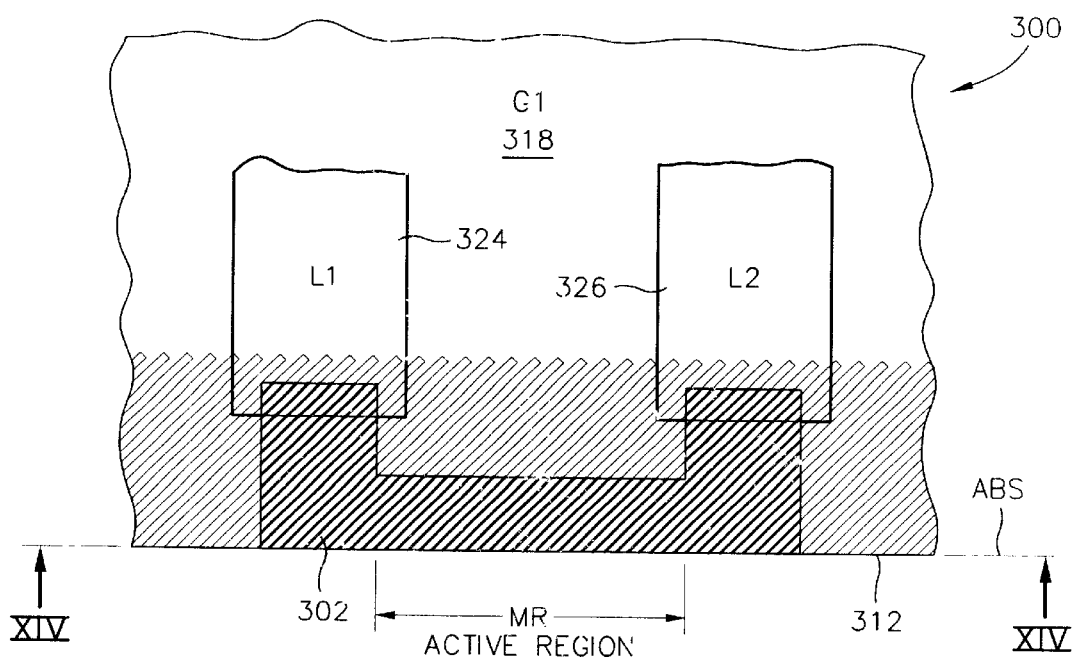
FIG. 13 is a view taken along plane XII—XII of FIG. 3 showing the present chevron type MR sensor.
Figure 14:
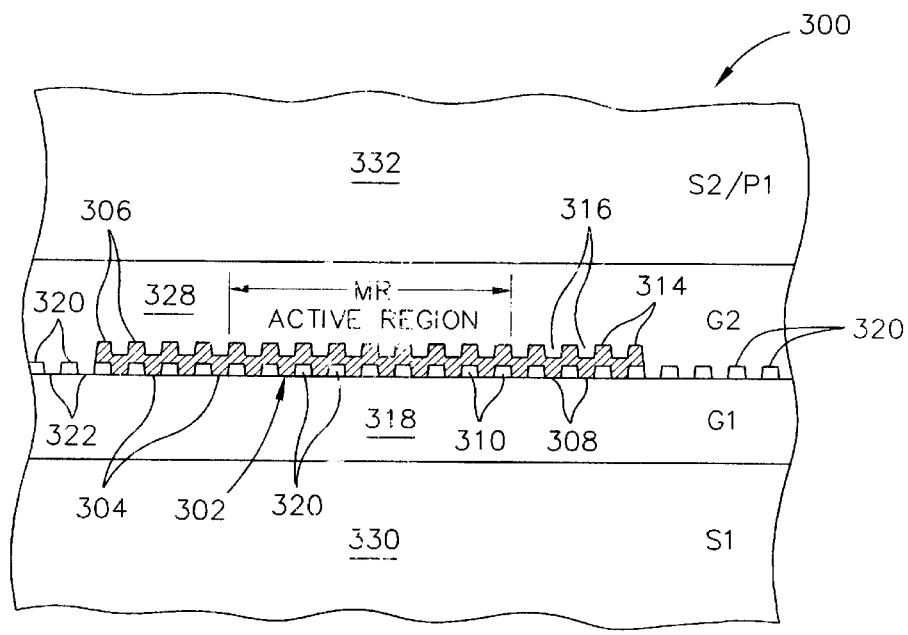
FIG. 14 is a view taken along plane XIII—XIII of FIG. 13 showing an ABS view of the present read head.

A novel read head 300 is shown in FIGS. 13 and 14 which employs the present chevron type MR sensor 302. As shown in FIG. 14, the MR sensor 302 has first and second surfaces 304 and 306. The first surface has inverted elongated ridges 308 and inverted elongated trenches 310 that alternate with respect to one another and that are slanted at the aforementioned angle to the head surface 312. In a like manner, the second surface 306 has ridges 314 and trenches 316 that alternate with respect to one another and that slant at the aforementioned angle to the head surface 312. Further, the ridges 308 of the first surface are positioned opposite the trenches 316 of the second surface and the ridges 314 of the second surface are positioned opposite trenches 310 of the first surface. The present MR read head 300 (FIGS. 13 and 14) differs from the prior art read head 200 (FIGS. 5 and 6) in that the present MR read head has second material strips 320 which are of a different material than the material of the first gap layer 318, which will be explained in more detail hereinafter. The first gap layer 318 in FIG. 14 has not been milled to form trenches, which trenches are shown filled with MR material in the prior art head 200 in FIG. 6. Other significant differences of the present MR head 300 is that the side walls of the ridges 308 and 314 and the side walls of the trenches 310 and 316 are planar and are perpendicular to planar top surfaces of the ridges and planar bottom surfaces of the trenches, which will be explained in more detail hereinafter. Further, the present MR sensor 302 does not have fencing since there is no redep of material which was caused by ion milling the first gap layer in the prior art method. As shown in FIG. 13, first and second leads 324 and 326 are connected to end portions of the MR sensor 302, thereby defining an active MR region therebetween. The MR sensor 302 is sandwiched between first and second gap layers 318 and 328 and the first and second gap layers are sandwiched between first and second shield layers 330 and 332.

Figure 15:
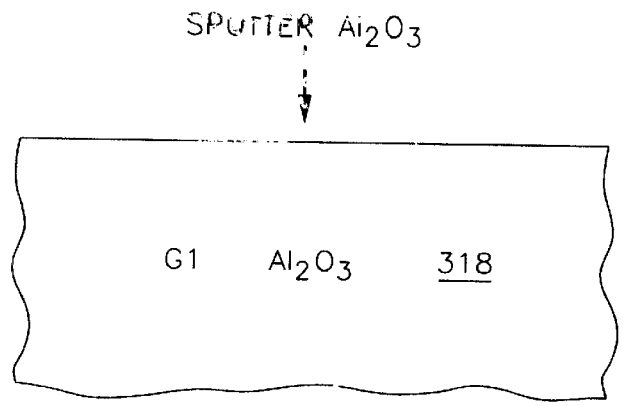
FIG. 15 shows a first step of the present method wherein a non-etchable first gap layer is deposited.
Figure 16:
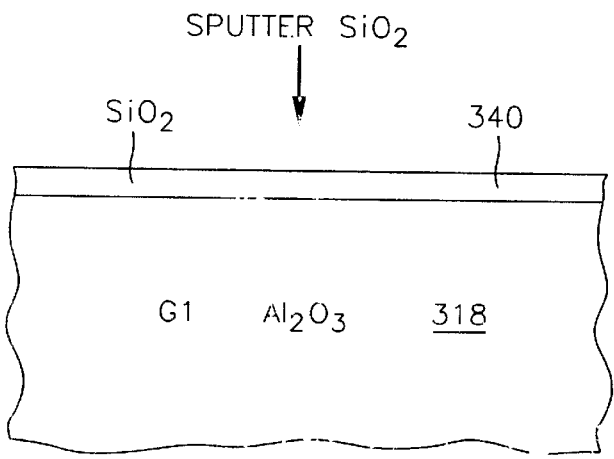
FIG. 16 is a second step of the present method of depositing a layer of etchable material on the first gap layer.
Figure 17:
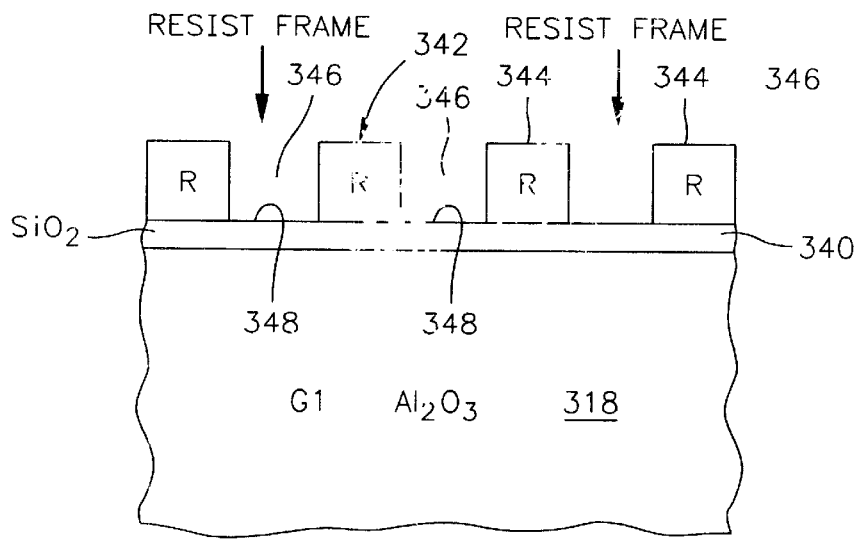
FIG. 17 is a third step of the present method wherein a photoresist frame is formed on the first gap layer.
Figure 18:
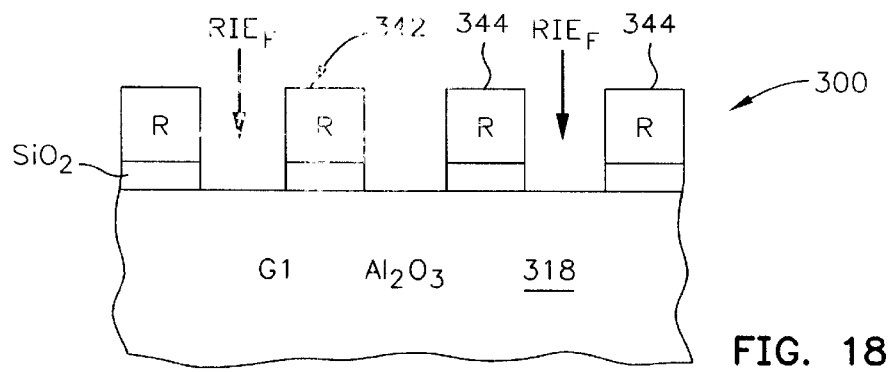
FIG. 18 is a fourth step of the present method wherein reactive ion etching (RIE) is employed to mill away unprotected portions of the etchable layer down to the first gap layer which is not etchable by the RAE.

The method of making the present MR sensor 302 and head 300 is shown in FIGS. 15–21. In FIG. 15 the first gap layer 318 is deposited on the first shield layer 330 of FIG. 14 by any suitable means such as sputter deposition. The first gap layer 318 is made of a first selected material, such as $AL_2O_3$. The next step is to deposit a second material layer 340 made of a second selected material by any suitable means, such as sputter deposition. An example of the material for the second material layer 340 is $SiO_2$. Next, a resist frame 342 is formed which comprises elongated resist strips 344 and openings 346 which are alternately arranged and slanted at the aforementioned angle to the head surface of the magnetic head. The openings 346 expose top surface portions 348 of the second material layer 340.

Figure 19:
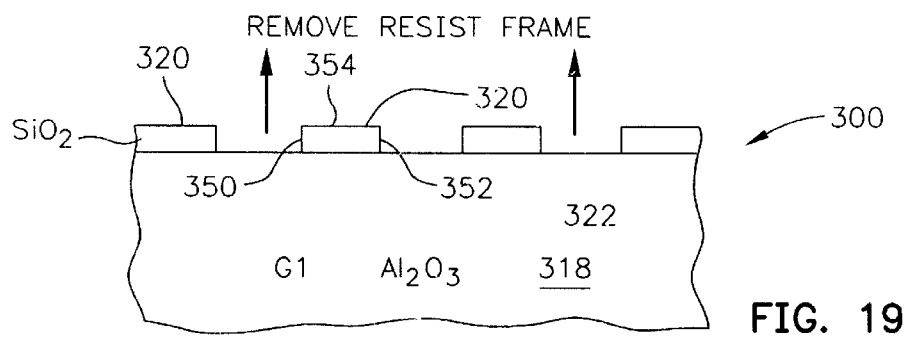
FIG. 19 is a fifth step of the present method wherein the resist frame is removed.
Figure 20:
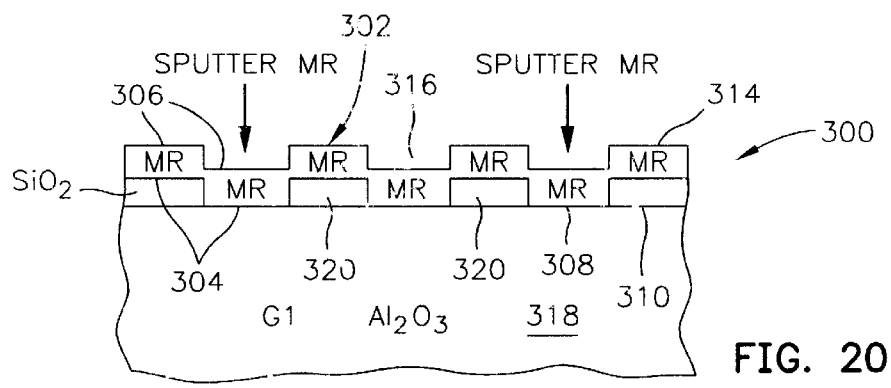
FIG. 20 is a sixth step of the present method showing deposition of MR material in the spaces between the etchable material and on top thereof to form the chevron shaped MR sensor.

The next step is to employ a selected reactive ion etch (RIE) which, by way of example, is fluorine based which is represented as $RIE_F$. It is important that the material of the second material layer 340 be etchable by the $RIE_F$ and that the material of the first gap layer 318 be not etchable by the $RIE_F$. In the examples given, the $SiO_2$ material of the second material layer 340 is etchable by the $RIE_F$ and the $AL_2O_3$ material of the first gap layer 318 is not etchable by the $RIE_F$. This is important from the standpoint that, even though the $RIE_F$ has etched for a duration longer than that necessary to completely mill away the exposed portions 348 of the second material layer 340, the $RIE_F$ will not mill into the $AL_2O_3$ material of the first gap layer 318. This provides for precise depth control of the MR structure to be subsequently formed. The next step is to remove the resist frame, as shown in FIG. 19. This leaves the aforementioned second material strips 320 wherein each strip 320 is bounded by the first gap layer 318, first and second side walls 350 and 352 and a top surface 354 which are all planar and perpendicular with respect to one another. Accordingly, each strip 320 has square corners and does not have any fencing which is a serious detriment resulting from the prior art method. It should be noted that at this point there has been no milling of the first gap layer 318 which specifically distinguishes the present method over the prior art method.

Figure 21:
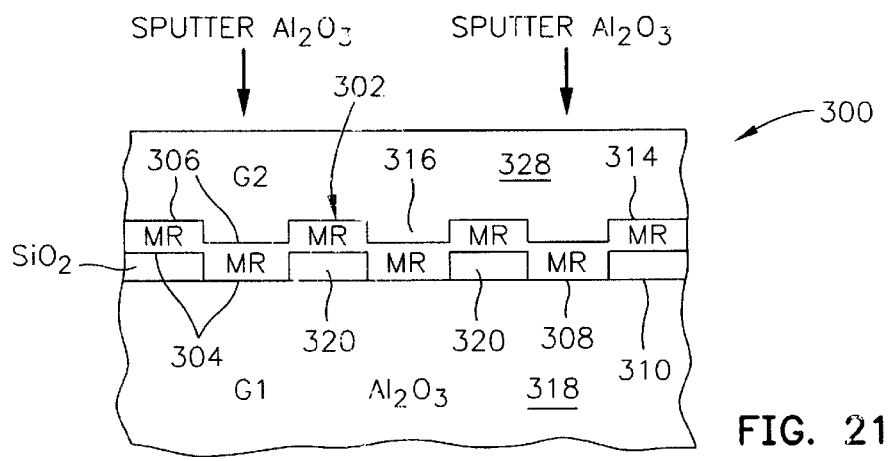
FIG. 21 is the same as FIG. 20 showing formation of a second gap layer on top of the chevron shaped MR sensor.

Next, MR material is formed on the first gap layer 318 and the strips 320 by any suitable means, such as sputter deposition. The MR material will replicate the strips 320 and the spaces 322 therebetween to form a chevron type MR sensor 302 that has the first and second surfaces 304 and 306 with ridges 308/314 and trenches 310/316, respectively. The MR material is deposited to a sufficient thickness so that the MR sensor has an intermediate portion between the ridges 308 and 314 for tying the structure together. It can be seen from FIG. 20 that the ridges 308 and 314 have first and second vertically oriented planar side walls which are perpendicular to horizontally extending flat surfaces. This results in the trenches 310 and 316 likewise having vertically oriented planar side walls which are perpendicular to horizontally extending flat surfaces. Accordingly, the MR sensor 302 has square corners which does not have any fencing. Because of this and precise depth control the present MR sensor can easily satisfy the design requirements of channel electronics, thereby promoting a high manufacturing yield. As shown in FIG. 21, the second gap layer 328 is deposited on the MR sensor 302 by any suitable means, such as sputtering. This causes the second gap layer to conform to the shape of the MR sensor 302.

In the broad aspect of this invention the second material layer is a stable oxide, such as $SiO_2$, SiO, SiON, SiN and $Ta_2O_5$. In a more narrow aspect of the invention the second material layer is silicon-based. In the preferred embodiment, the second material layer is $SiO_2$. In a broad concept of the invention, the material of the gap layer is $Al_2O_3$ or a polyimide. In a preferred embodiment the material of the first gap layer is $Al_2O_3$. In a broader concept of the invention the fluorine base of the RIE is $CF_4$, $SF_6$, or $CHF_3$. In a preferred embodiment the base of the RIE is $CF_4$. Accordingly, a preferred embodiment of the invention is $SiO_2$ for the second material layer, $Al_2O_3$ for the material of the first gap layer and a RIE that has $CF_4$ base. It should be understood that the RIE takes place in a chamber where the plasma in the chamber contains the fluorine based gas such as $CF_4$. The partially completed head is part of an anode in the chamber and a cathode in the chamber provides a stream of electrons directed toward the partially completed head to remove the exposed portions of the $SiO_2$. The fluorine base provides the necessary chemical etching for removing the exposed portions of the second material layer with great selectivity, and yet without any danger of milling into the first material of the first gap layer 318. The result is a highly-defined predictable MR sensor which substantially increases the manufacturing yield.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. A method of making a magnetoresistive (MR) head that has a MR sensor sandwiched between first and second gap layers, each of the MR sensor and the first and second gap layers having first and second surfaces that face in opposite directions and are substantially perpendicular to a head surface, the first surface of the MR sensor interfacially engaging the second surface of the first gap layer and the second surface of the MR sensor interfacially engaging the first surface of the second gap layer, the method comprising:

forming the first gap layer of a first material that is resistant to a reactive ion etch (RIE);

forming an etchable layer of a second material on the second surface of the first gap layer, the etchable layer being etchable by said reactive ion etch (RIE);

forming a mask on a second surface of the etchable layer with a plurality of alternating elongated ridges and elongated spaces;

the ridges and spaces of the mask having longitudinal axes that are parallel with respect to one another and that slant at an angle θ between 0° and 90° with respect to said head surface and the spaces exposing spaced apart elongated surface portions of the etchable layer;

etching the exposed surface portions of the etchable layer with said RIE down to said first gap layer to form alternating elongated ridges and elongated spaces in the etchable layer that are substantially parallel with respect to one another and slanted at said angle θ to said head surface;

removing the mask;

depositing ferromagnetic material on the ridges and in the spaces of the etchable layer to form said chevron type MR sensor; and forming said second gap layer on the chevron type MR sensor.

2. A method as claimed in claim 1 wherein the second material is a stable oxide.

3. A method as claimed in claim 1 wherein the RIE is fluorine based.

4. A method as claimed in claim 1 wherein said first material is alumina or polyimide.

5. A method as claimed in claim 1 wherein the spaces of the etchable layer expose elongated surface portions of the first gap layer that are substantially parallel with respect to one another and are slanted at said angle θ to said head surface.

6. A method as claimed in claim 1 wherein the first material comprises $Al_2O_3$, the second material comprises $SiO_2$ and the RIE comprises $RIE_F$.

7. A method as claimed in claim 1 wherein the first gap layer, the etchable layer and the MR sensor are formed by sputter deposition.

8. A method as claimed in claim 1 wherein said depositing forms:

each surface of the MR sensor with alternating elongated ridges and elongated trenches that are parallel with respect to one another;

the ridges of the first surface being located opposite the trenches of the second surface and the ridges of the second surface being located opposite the trenches of the first surface; and the MR sensor with an intermediate portion that is integral with the ridges of the first and second surfaces of the MR sensor and surface portions that form bottoms of the trenches of the first and second surfaces of the MR sensor.

9. A method as claimed in claim 8 wherein the second material is a stable oxide.

10. A method as claimed in claim 9 wherein the RIE is fluorine based.

11. A method as claimed in claim 10 wherein said first material is alumina or polyimide.

12. A method as claimed in claim 11 wherein the spaces of the etchable layer expose elongated surface portions of the first gap layer that are substantially parallel with respect to one another and are slanted at said angle θ to said head surface.

13. A method as claimed in claim 12 including:

said mask being photoresist; and the first gap layer, the etchable layer and the MR sensor being formed by sputter deposition.

14. A method as claimed in claim 13 wherein the second material is selected from the group containing $SiO_2$, SiO, SiON, SiN and $Ta_2O_5$.

15. A method as claimed in claim 14 wherein the fluorine is selected from the group containing $CF_4$, $SF_6$ and $CHF_3$.

16. A method as claimed in claim 15 wherein the first material comprises $Al_2O_3$, the second material comprises $SiO_2$ and the RIE comprises $RIE_F$.

* * * * *